(12) United States Patent
Dohrmann et al.

(10) Patent No.: US 6,655,509 B2
(45) Date of Patent: Dec. 2, 2003

(54) IMPACT DAMPER

(75) Inventors: Wolfgang Dohrmann, Eitorf (DE); Paul Eberhard Krug, Langenfeld (DE)

(73) Assignee: ZF Boge GmbH, Bonn (DE)

( * ) Notice: Subject to any disclaimer, the term of this patent is extended or adjusted under 35 U.S.C. 154(b) by 0 days.

(21) Appl. No.: 10/202,544

(22) Filed: Jul. 24, 2002

(65) Prior Publication Data

US 2003/0019698 A1 Jan. 30, 2003

(30) Foreign Application Priority Data

Jul. 25, 2001 (DE) ........................................ 101 36 300

(51) Int. Cl.$^7$ .................................................. F16F 9/34
(52) U.S. Cl. .................... 188/266.2; 188/269; 188/317; 188/313; 188/297; 267/64.13; 267/116; 267/64.26; 267/64.28
(58) Field of Search ............................ 188/266.1, 266.2, 188/266.5, 269, 281, 283, 316, 317, 297, 313; 267/64.13, 64.26, 64.28, 116

(56) References Cited

U.S. PATENT DOCUMENTS

| | | | | |
|---|---|---|---|---|
| 3,554,387 A | * | 1/1971 | Thornhill et al. ............ 213/223 |
| 3,743,109 A | * | 7/1973 | Hutchison .................... 213/43 |
| 3,751,023 A | * | 8/1973 | Thomas ..................... 267/64.26 |
| 3,814,219 A | * | 6/1974 | Fannin et al. ............ 188/282.8 |
| 3,904,182 A | * | 9/1975 | Allinquant et al. ....... 267/64.26 |
| 4,381,857 A | * | 5/1983 | Cook ....................... 267/64.15 |
| 4,426,109 A | * | 1/1984 | Fike, Jr. .................... 293/133 |
| 4,506,869 A | * | 3/1985 | Masclet et al. .......... 267/64.15 |
| 5,094,407 A | * | 3/1992 | Jampy et al. .......... 244/104 FP |
| 5,443,146 A | * | 8/1995 | Ayyildiz et al. ............. 188/374 |
| 6,019,356 A | * | 2/2000 | Ayyildiz et al. ............. 267/139 |
| 6,027,105 A | * | 2/2000 | Dohrmann et al. ......... 267/139 |
| 6,109,400 A | * | 8/2000 | Ayyildiz et al. .......... 188/266.1 |
| 6,340,153 B1 | * | 1/2002 | Miesner ................. 267/140.11 |

* cited by examiner

*Primary Examiner*—Jack Lavinder
*Assistant Examiner*—Devon Kramer
(74) *Attorney, Agent, or Firm*—Cohen, Pontani, Lieberman & Pavane

(57) ABSTRACT

An impact damper as a connecting member between a bumper and a chassis of a motor vehicle for the purpose of damping the shock loading during a collision between this motor vehicle and an obstacle through hydraulic damping forces and gas-spring forces. This impact damper includes an inner tube which can be displaced telescopically inside an outer tube, thereby changing the volume of a pressurized gas space, which interact by means of a separating piston with a first liquid space, which communicates hydraulically via a restriction orifice with a second liquid space, which is bounded by a deformation element. The separating piston is arranged in a floating manner in the inner tube and thereby brings about a static equilibrium by pressure compensation in the liquid spaces and in the gas space. The outer tube furthermore has a drawn-in portion around the deformation element, which brings the outer tube to a reduced diameter, within which is arranged a compensation space that can be filled with gas formed by an end wall at the end of the outer tube. The deformation element has an adjustable control valve, which can be controlled from outside the impact damper by a detection sensor system. The compensation space furthermore communicates with an accumulator, which can likewise activate the pressure in the gas spaces in response to the detection sensor system.

7 Claims, 1 Drawing Sheet

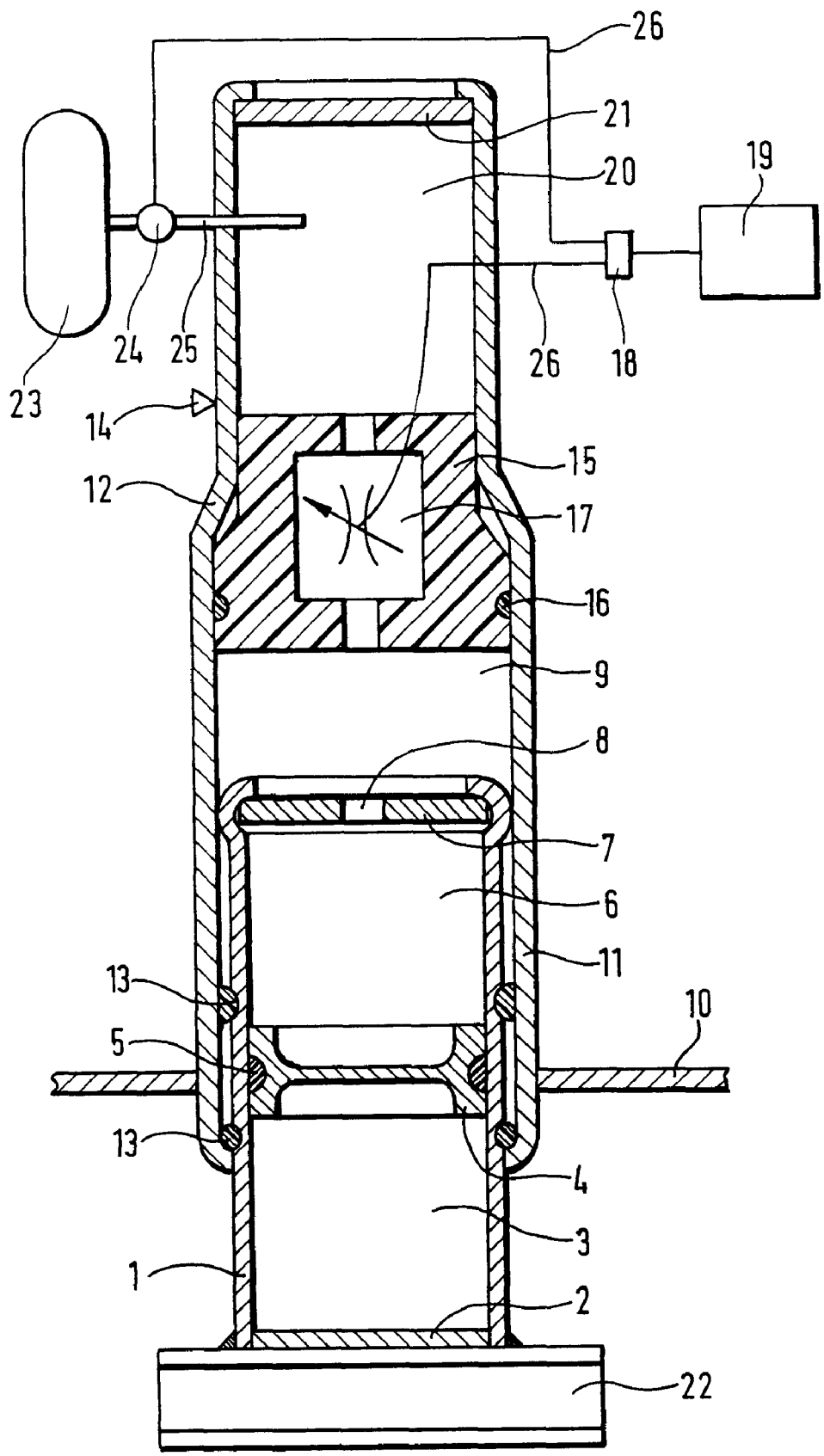

IMPACT DAMPER

BACKGROUND OF THE INVENTION

1. Field of the Invention

The invention relates to an impact damper as a connecting member between a bumper and a chassis of a motor vehicle for the purpose of damping the shock loading during a collision between this motor vehicle and an obstacle through hydraulic damping forces and gas-spring forces. This impact damper essentially includes an inner tube, which can be displaced telescopically inside an outer tube, thereby changing the volume of a pressurized gas space, which interact by means of a separating piston with a first liquid space, which communicates hydraulically via a restriction orifice with a second liquid space, which is bounded by a deformation element. The separating piston is arranged in a floating manner in the inner tube and thereby brings about a static equilibrium by pressure compensation in the liquid spaces and in the gas space. The outer tube furthermore has a drawn-in portion around the deformation element, which brings the outer tube to a reduced diameter, within which is arranged a compensation space that can be filled with gas formed by an end wall at the end of the outer tube.

2. Description of the Related Art

U.S. Pat. No. 6,109,400, for example, discloses impact dampers of this kind in which use is made of two tubes that can be displaced one inside the other and within which a tandem damping system comprising respective gas spaces and liquid spaces has been set up. The arrangement of a plurality of pistons makes it possible to connect a first gas-space/liquid-space damping system to a second gas-space/liquid-space damping system via a piston rod. The aim of this arrangement is to react to the severity of the collision by activating the first gas-space/liquid damping system first, while the second gas-space/liquid damping system remains at rest. The high gas pressure in the gas space ensures that the impact damper springs back after a relatively light collision at low motor-vehicle speeds. Even after the activation of the second gas-space/liquid damping system, which gives the impact damper a progressive characteristic, the impact damper returns to its initial position after a collision at a somewhat higher speed.

Apart from the outlay and the space requirement for an impact damper of this kind, it primarily serves its purpose of cushioning the mass of the motor vehicle when it hits an obstacle, the primary concern here being self-preservation, not the protection of the obstacle as well, which, apart from the wall of a house or a parking motor vehicle, can also be a two-wheeled vehicle or a pedestrian.

SUMMARY OF THE INVENTION

The object of the invention is to provide an impact damper with gas spaces and liquid spaces that react to the obstacles with which the motor vehicle collides with a softer or harder setting, i.e. a lower or higher pressure in the gas spaces, depending on the mass of the obstacle.

As a solution to this object, the proposal is to provide an impact damper, likewise comprising an outer tube and an inner tube, within which a first and a second gas space are arranged, which are separated by two liquid spaces that are connected to one another via a partition wall with a restriction orifice. The first gas space is arranged in the inner tube at the bumper end and is separated from the first liquid space by a dividing piston arranged in a floating manner in the inner tube. The first liquid space in turn is separated, by a partition wall with a restriction at the chassis end of the inner tube, from the second liquid space, which is arranged in the outer tube and adjoins a deformation element that comes to rest on a drawn-in portion in the outer tube. This portion bringing the latter to a reduced diameter toward its chassis end. The deformation element has an adjustable control valve, which can be opened and closed via an electrical control line. At the chassis end of the outer tube, the latter encloses a compensation space (second gas space), which is filled with gas and can be brought optionally to a high or a low pressure. For this purpose, the compensation space is connected by a pneumatic feed line to an accumulator, the latter containing a regulating valve, which can be controlled electrically.

The fittings of the impact damper are configured in such a way that they can be activated within fractions of a second and can vary the impact-damper setting in such a way that the shock to be expected against the bumper can be taken in an optimum way when the motor vehicle is involved in a collision.

Nowadays, a detection sensor system in the motor vehicle is capable of detecting the size and mass of an obstacle while allowing for the speed of the motor vehicle and of converting them into electrical commands. These are fed to the regulating valve—insofar as this is required—and/or to the adjustable control valve via the electrical control line and implemented, as described below.

In the case of collisions with low shock loading, the inner tube is pushed into the outer tube, only the first gas space being reduced in size, and the gas charge being compressed. In this process, the interaction of the first liquid space with the second liquid space performs damping functions by virtue of the fact that liquid is forced from the second liquid space into the first liquid space through the restriction orifice in the partition wall. As a result, the first liquid space increases in size by virtue of the fact that the dividing piston slides in the inner tube in the direction of the bumper and reduces the size of the first gas space and thus increases the pressure there. Once inward motion is finished, the gas spring formed by the first gas space ensures that the inner tube returns to its initial position.

It is possible likewise to connect the first gas space to a regulating valve and then to the accumulator via a pneumatic feed line, making it possible to vary the gas spring for collisions involving relatively low shock loading. However, such a measure increases the cost of the device and is therefore feasible only on more valuable motor vehicles. The preloading in the first gas space is therefore chosen to allow primarily for collisions with two-wheeled vehicles or pedestrians.

Shock loads involving a higher momentum can be taken without destruction of the impact damper up to a certain level by virtue of the fact that the adjustable control valve is opened, with the result that liquid is forced from the second liquid space into the compensation space, performing damping work in the process. In addition to the aperture cross section of the control valve, it is the pressure in the compensation space which determines the quantity of liquid that flows into the compensation space. However, the damping work can be performed by the impact damper in this manner only once, since the liquid can be returned from the compensation space only under specific workshop conditions, if at all. Moreover, the inner tube is no longer returned to the initial position because of the reduction in size of the liquid spaces.

The presence of the deformation element has been found to be advantageous in the case of collisions with the highest shock loads, the deformation element being pushed with a diameter corresponding to the diameter of the outer tube into the reduced-diameter end of the tube, expanding the latter and absorbing deformation work, as a result of which the frame of the motor vehicle may remain free from deformation and repair of the motor vehicle may be limited to replacement of the impact dampers and possibly of the bumper. During this process, the control valve is fully open, and the pneumatic pressure in the compensation space is raised to the maximum possible value in order to fully exploit the potential of the spring forces in the gas spaces as well.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The sole FIGURE is a longitudinal section view of an impact damper according to the invention.

DETAILED DESCRIPTION OF THE PRESENTLY PREFERRED EMBODIMENTS

The FIGURE shows a variable-length impact damper for a chassis of a motor vehicle, an inner tube 1, closed off from the outside by a wall 2, enclosing a first gas space 3, which is provided with a gas charge under high pressure. Connected to the wall 2 and/or the inner tube 1 is a fastening element 22, which connects the impact damper to a bumper. A first liquid space 6, which is likewise situated in the inner tube, is separated from the first gas space 3 by a dividing piston 4, which is sealed off by means of a sealing ring 5 and slides on the inner wall of the inner tube 1. At the opposite end from the dividing piston 4, the first liquid space 6 is bounded by a partition wall 7, which is secured in the inner tube 1 and is provided with a restriction orifice 8 and hence establishes a hydraulic connection with a second liquid space 9, which is likewise arranged in the inner tube 1. The inner tube 1 slides on the inner wall of an outer tube 11 and is sealed off by at least one sealing ring 13. The outer tube 11 is connected to the chassis of the motor vehicle by a mounting flange 10, thereby establishing the connection of a bumper to the chassis of the motor vehicle.

The second liquid space 9 is bounded at the opposite end from the partition wall 7 by a deformation element 15, which seals off the second liquid space 9 by means of a sealing ring 16, the outer tube 11 having, after this point, at the chassis end, a drawn-in portion 12 that reduces the outer tube 11 to a reduced diameter 14. This drawn-in portion 12 fixes the deformation element 15 in the direction of the chassis, it being possible for this fixing to be changed only by high forces that expand the reduced diameter. The deformation element 15 has an adjustable control valve 17, which is connected to a detection sensor system 19 by an electrical control line 26 via a terminal 18. Since the adjustable control valve 17 is normally closed, the deformation element 15 separates the second liquid space 9 from a compensation space 20, which is connected by a pneumatic feed line 25 to an accumulator 23. An end wall 21 forms the opposite boundary of the compensation space 20 from the deformation element 15.

Arranged in the pneumatic feed line 25 is a regulating valve 24, which is likewise connected to the detection sensor system 19 by the electrical control line 26.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An impact damper for installation between a bumper and a chassis of a motor vehicle for damping shock loading during a collision between the motor vehicle and an obstacle, raid impact damper comprising an inner tube having a pressurized gas space and a first liquid space, an outer tube having a second liquid space, a drawn-in portion having a reduced diameter, and a compensation spa e in said drawn-in portion, said inner tube being telescopically displaceable in said second liquid pace in said outer tube, a partition fixed to aid inner tube and separating said first liquid space from said second liquid space, said partition having a restriction orifice which permits hydraulic communication between said first and second liquid spaces, a separating piston arranged in a floating manner in the inner tube and separating said gas space and said first liquid space, said separating piston bringing about a static equilibrium by pressure compensation in the liquid spaces and in the gas space, a deformation element arranged in said outer tube between said second liquid space and said compensation space, a control valve in said deformation element connecting said second liquid space and said compensation space, said control valve being controllable from outside the impact damper, and means for filling said compensation space with a gas.

2. An impact damper as in 1 further comprising a detection sensor system connected to said control valve by an electrical control line, said detection sensor system determining the magnitude of forces expected during a collision and opening said control valve in dependence on the magnitude of forces expected during the collision with an obstacle.

3. An impact damper as claim 2 wherein, when the detection sensor system determines that the magnitude of forces expected during a collision is relatively large, the control valve is opened to an extent that hydraulic work takes place as liquid moves from said second liquid space to said compensation space.

4. An impact damper as in claim 1 wherein, when the detection sensor system determines that a high shock loading will occur during a collision at a high speed of impact, said the control valve is fully opened so that said deformation element is pushed into said compensation space, thereby absorbing impact energy by deforming said outer tube.

5. An impact damper for installation between a bumper and a chassis of a motor vehicle for damping shock loading during a collision between the motor vehicle and an obstacle, said impact damper comprising an inner tube having a pressurized gas space and a first liquid space, an outer tube having a second liquid space, a drawn-in portion having a reduced diameter, and a compensation spa e in said drawn-in portion, said inner tube being telescopically displaceable in said second liquid space in said outer tube, a partition fixed to said inner tube and separating said first liquid space from said second liquid space, said partition having a restriction orifice which permits hydraulic communication between said first a d second liquid spaces, a separating piston arranged in a floating manner in the inner tube and separating said gas space and said first liquid space, said separating piston bringing about a static equilibrium by pressure compensation in the liquid spaces and in the gas space, a deformation element arranged in said outer tube between said second liquid space and said compensation space, an accumulator which communicates with said compensation space via a pneumatic feed line, and a regulating valve in said pneumatic feed line, whereby said accumulator can increase the pressure in said compensation space abruptly by opening said regulating valve.

6. An impact damper as in claim 5 further comprising a detection sensor sys em for determining the magnitude of forces expected during a collision and controlling said regulating valve in dependence on the magnitude of forces expected during the collision with an obstacle.

7. An impact damper as in claim 6 further comprising a pneumatic line connecting said accumulator to said pressurized gas space in said inner tube, whereby damping work in said pressurized gas space can be increased.

* * * * *